Feb. 21, 1956  H. G. KELLER  2,735,537
BELT CONVEYOR
Filed Nov. 5, 1951  4 Sheets-Sheet 1
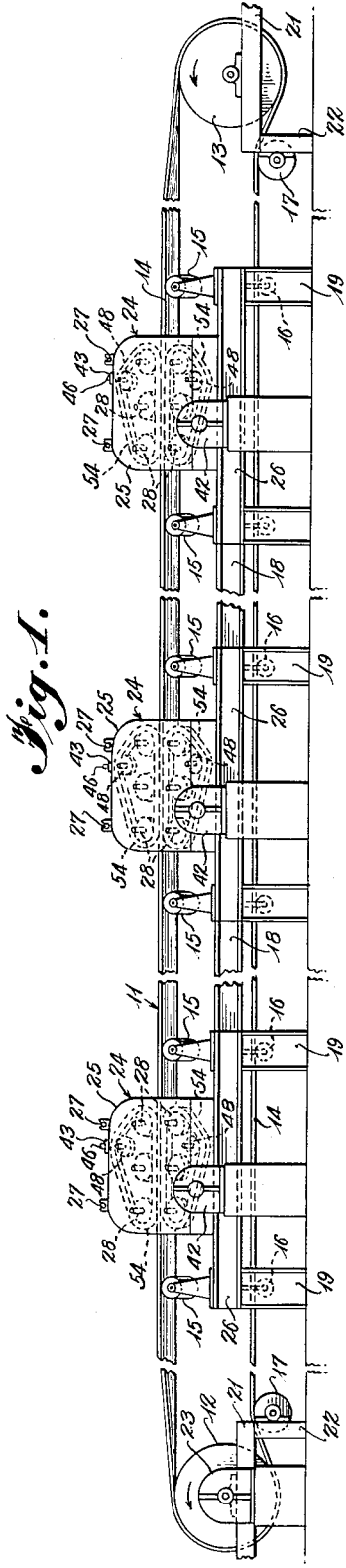
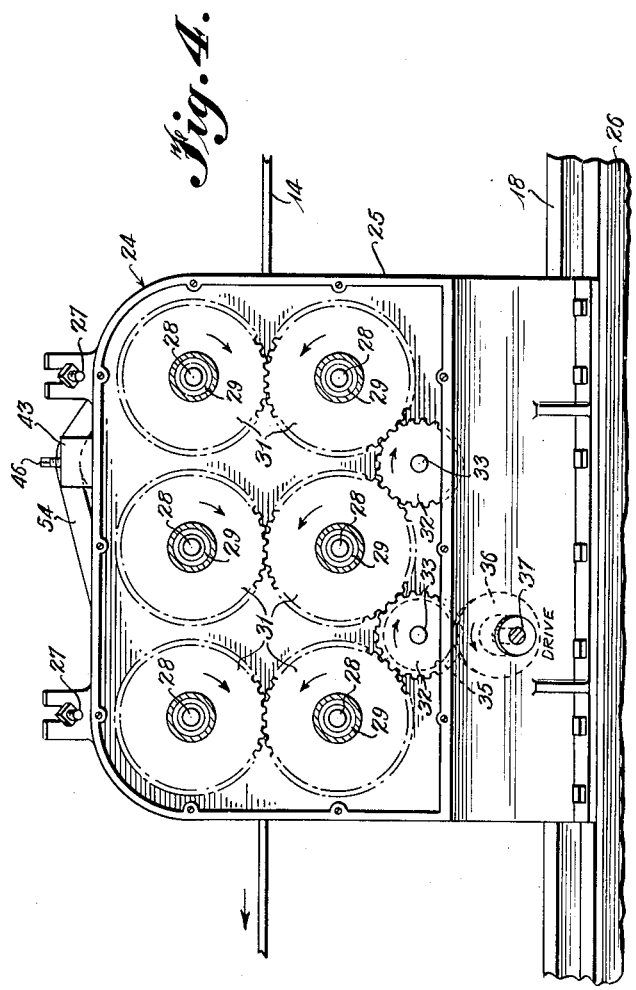
INVENTOR
*Henry G. Keller*
BY
ATTORNEY

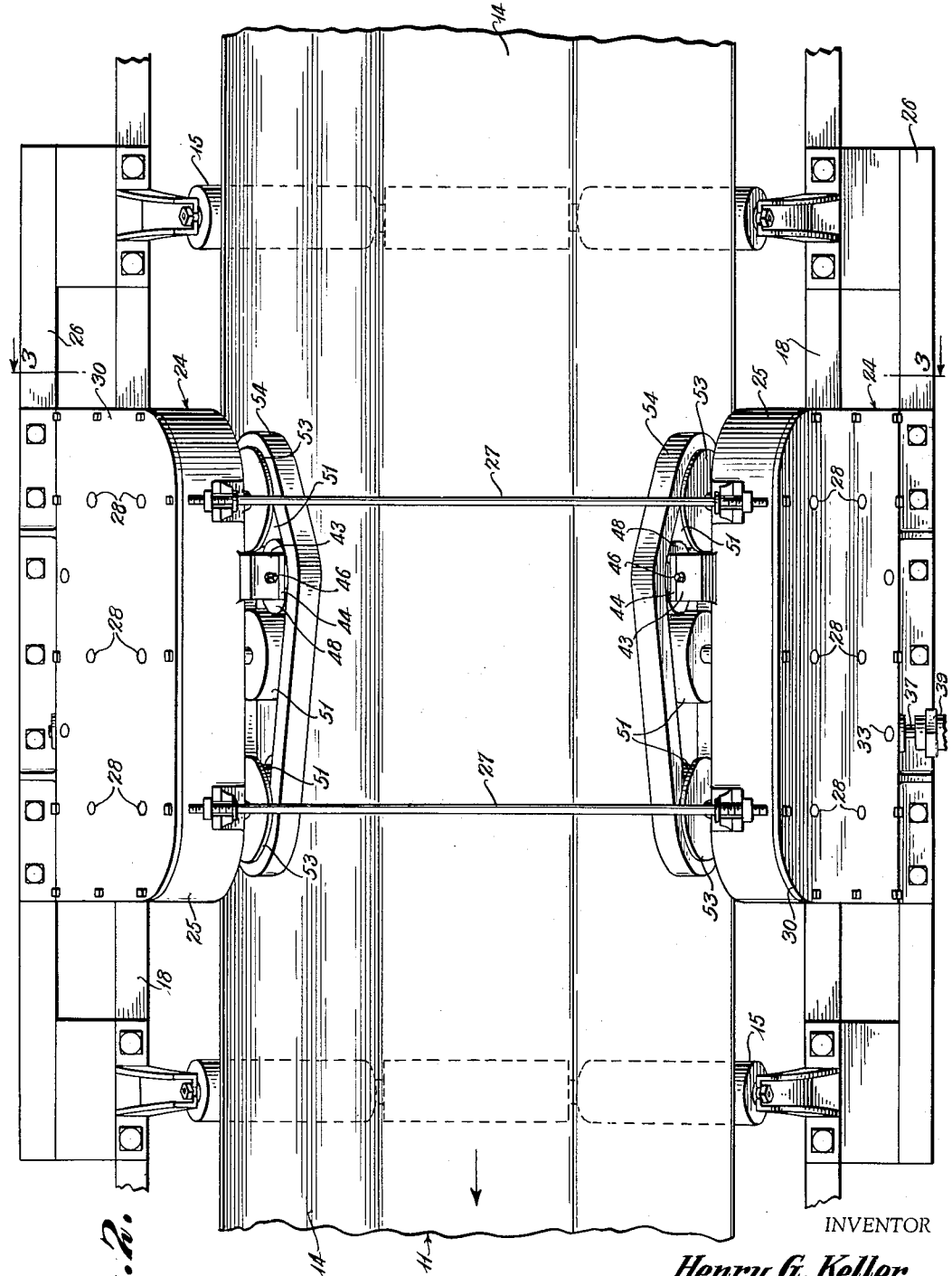

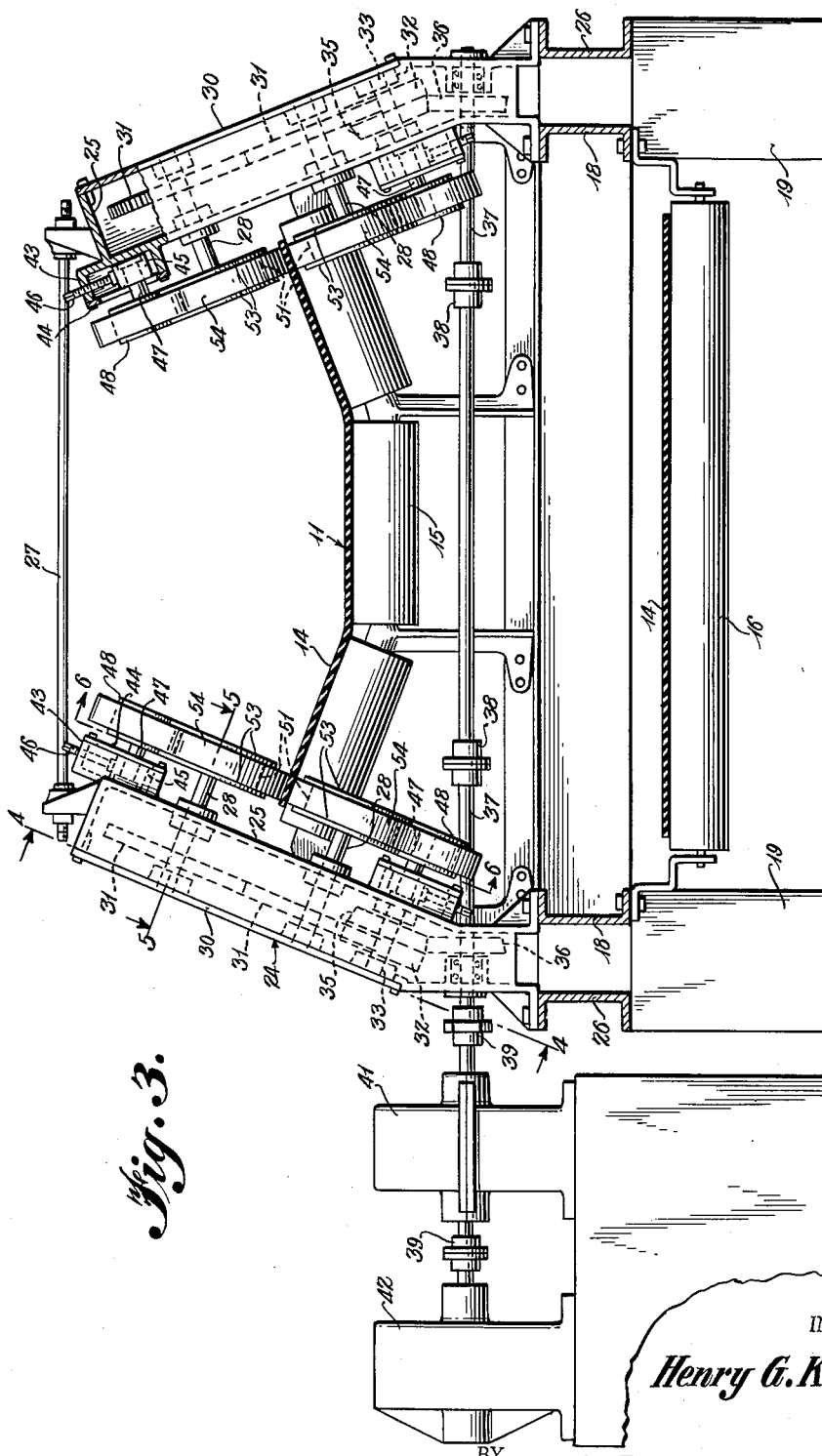

Feb. 21, 1956     H. G. KELLER     2,735,537
BELT CONVEYOR
Filed Nov. 5, 1951     4 Sheets-Sheet 4
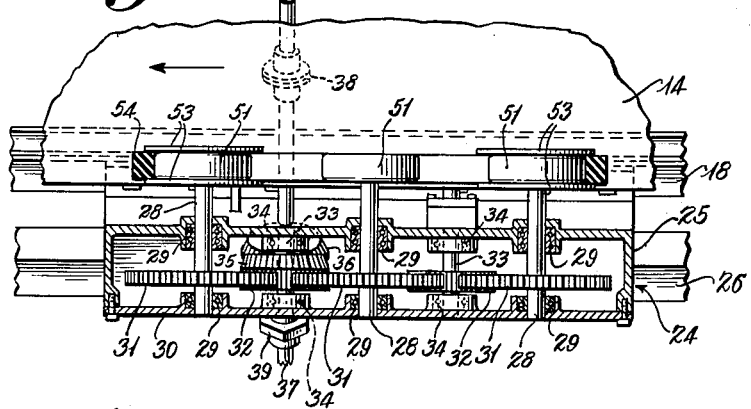
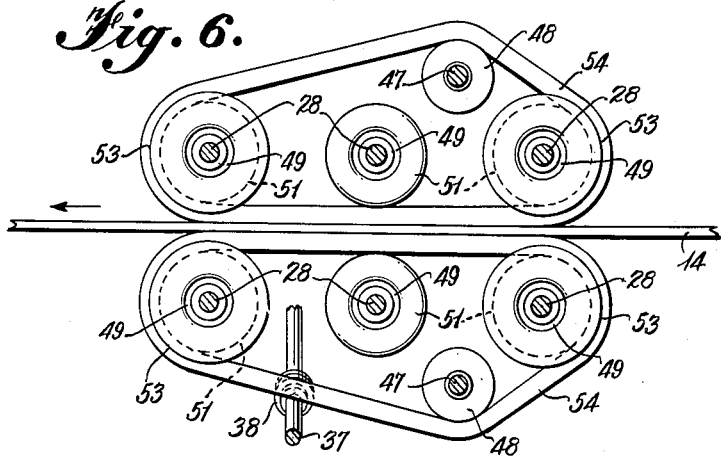
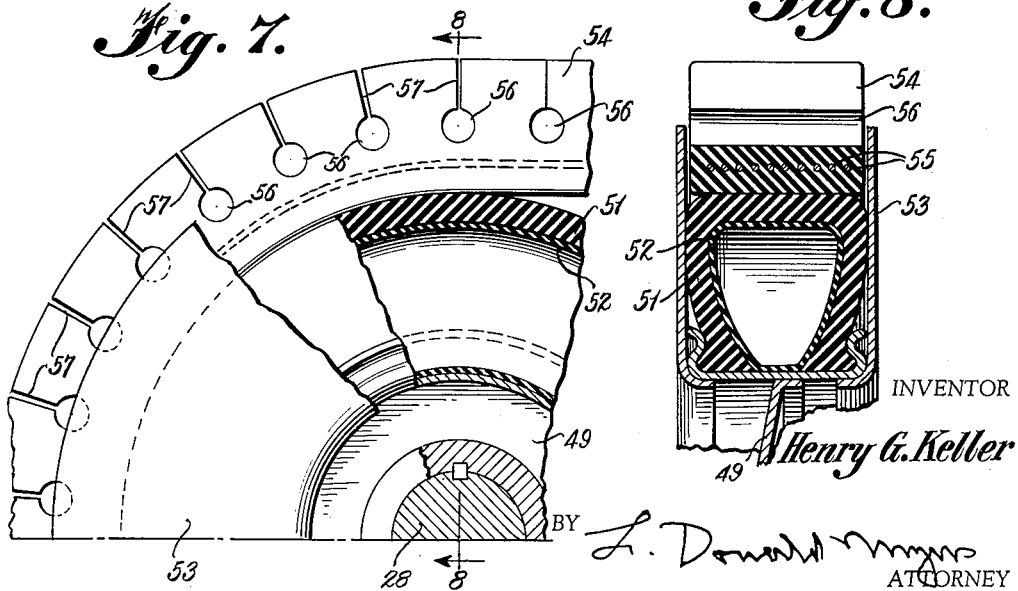
INVENTOR
Henry G. Keller
BY
ATTORNEY

United States Patent Office 2,735,537
Patented Feb. 21, 1956

2,735,537

BELT CONVEYOR

Henry G. Keller, Glenside, Pa., assignor to Link-Belt Company, a corporation of Illinois Application November 5, 1951, Serial No. 254,852

16 Claims. (Cl. 198—203)

This invention relates to new and useful improvements in belt conveyors and deals more specifically with units for driving such conveyors by gripping certain portions of the conveyor belt between moving endless driving belts.

Conventional belt conveyors in the past have been driven by one terminal pulley which applies the tension forces necessary to move the belt and its load. These tension forces, therefore, have a maximum value in that portion of the belt immediately preceding its point of engagement with the terminal pulley. It will be apparent that with such an arrangement the length of the conveyor is limited to the maximum permissible tension forces that can be applied to the conveying belt.

In response to a desire for belt conveyors of greatly increased length, it has been suggested that intermediate or booster drive units be employed to engage and drive the conveyor belt at one or more points between its terminal pulleys. The forces necessary to drive the conveyor thereby would be distributed longitudinally over the belt to greatly reduce the maximum tension forces to be applied to any portion of the belt.

The primary object of this invention is to provide an endless belt conveyor that is driven by a plurality of units which are located at spaced intervals along a desired run of a belt and with each unit adapted to apply a portion of the total force necessary to drive the conveyor by gripping the edge portions of the belt between opposed drive belts.

A more specific object of the invention is to provide a belt conveyor drive unit having elongated, pneumatically cushioned drive belts arranged to grip the edge portions of the conveying belt therebetween to apply driving forces to the belt.

Other objects and advantages of the invention will be apparent during the course of the following description.

In the accompanying drawings forming a part of this specification and in which like reference characters are employed to designate like parts throughout the same, Figure 1 is a side elevational view, partly broken away, of a belt conveyor embodying the invention, Figure 2 is an enlarged top plan view of one of the conveyor drive units illustrated in Fig. 1, Figure 3 is a vertical sectional view taken on line 3—3 of Fig. 2, Figure 4 is a sectional view taken on line 4—4 of Fig. 3, Figure 5 is a sectional view taken on line 5—5 of Fig. 3, Figure 6 is a sectional view taken on line 6—6 of Fig. 3, Figure 7 is a fragmentary side elevational view, partly broken away, showing the position of the drive belt on one of the drive wheels, and Figure 8 is a vertical sectional view taken on line 8—8 of Fig. 7.

In the drawings, wherein for the purpose of illustration is shown the preferred embodiment of this invention, and first particularly referring to Fig. 1, reference character 11 designates a belt conveyor which includes a terminal pulley 12 at the head end of the conveyor, a terminal pulley 13 at the tail end of the conveyor, and a standard commercial endless conveyor belt 14 having an active run and a return run between the terminal pulleys. The active run of the belt 14 is supported by a plurality of troughing idlers 15 and the inactive or return run of the belt is supported by a plurality of flat idlers 16. Adjacent each of the terminal pulleys 12 and 13, snubbing pulleys 17 engage the belt 14 to increase the contact area between the belt and the terminal pulleys. The idler rolls 15 and 16 are mounted in a conventional manner on longitudinal channel beams 18 which are supported by vertical posts 19 on opposite sides of the conveyor 11. The terminal pulleys 12 and 13 are suitably mounted on longitudinal beams 21 supported by vertical posts 22 and the snubbing pulleys 17 are mounted directly onto the posts 22.

The terminal pulley 12 at the head end of the conveyor 11 is driven by a motor 23 to apply a driving force to the belt 14 and additional driving forces are applied to the active run of the belt by intermediate or booster drive units 24 which are positioned at longitudinally spaced intervals along the conveyor.

It will be appreciated that the number of drive units 24 employed in a given conveyor installation will vary in accordance with the length of the conveyor. The spacing between adjacent drive units 24 will vary in accordance with the maximum permissible value of the tension forces that may be applied to the belt 14. Generally speaking, the tension forces in a conveyor belt increase from the lowest value immediately beyond one point of application of a driving force to the maximum value immediately preceding the next succeeding point of application. The rate of increase of the tension forces in the belt depends primarily upon the weight of the belt and the material being conveyed and the angle of inclination of the conveyor, if any. In view of these general facts, the intermediate drive units 24 should be so positioned along the length of the belt 11 that the tension forces at any location will not exceed their maximum permissible value.

Referring now to Figs. 2 to 5, inclusive, for a detail description of one of the several identical drive units 24, it will be noted that the troughing idlers 15 support the opposite marginal portions of the active run of the belt 14 in upwardly inclined positions. On opposite sides of the conveyor 11 and adjacent its inclined portions are positioned the separate gear housings 25 with each housing being arranged in normal relationship with its adjacent portion of the belt. Each housing 25 is mounted on its adjacent channel beam 18 and on a second channel beam 26, arranged in back-to-back relationship. Lateral support is provided for the housings 25 by the tie rods 27 which extend transversely between and are connected to the upper portions of the housings. The tie rods 27 are located at a sufficient distance above the belt 14 to provide clearance for passage of the material that is transported by the conveyor 11.

Each of the housings 25 is provided with a plurality of shafts 28 which are rotatably supported by bearings 29 mounted on the walls of the housings, as is best illustrated in Fig. 5. In this connection, it will be noted that the outer wall of each housing 25 is formed of a removable cover plate 30. All of the shafts 28 of each housing 25 are arranged in parallel relationship with each other and with the plane of the adjacent inclined portion of the belt 14. Further, the shafts 28 are arranged in vertically opposed pairs with each pair having the corresponding shaft end portions extending inwardly from its housing 25 to equally spaced positions above and below the inclined adjacent portion of the belt 14. As illustrated in Fig. 5, the axis of each shaft 28 is arranged in normal relationship with the center line of the belt 14.

Rigidly mounted on each shaft 28 within its housing 25 is a gear 31 that meshes with the gear 31 of its vertically opposed shaft, as illustrated in Fig. 4. The lower ones of adjacent pairs of meshing gears 31 are drivingly connected by pinions 32 so that all of the gears are locked together for simultaneous rotation. The pinions 32 are rigidly connected to the shafts 33 which are rotatably supported by bearings 34 mounted in the walls of the housing 25. All of the shafts 33 are arranged in parallel relationship in their housings 25.

A bevel pinion 35 is mounted on one of the shafts 33 adjacent its pinion 32 and meshes with the adjacent bevel gear 36 mounted on the sectional drive shaft 37 which extends between and is supported by the housings 25 on opposite sides of the conveyor 11. The several sections of the drive shaft 37 are connected by the couplings 38 to compensate for any misalinement. One end of the shaft 37 is connected by couplings 39 and a speed reducer 41 to a motor 42 for driving the entire gear set.

Figs. 2 and 3 best illustrate the inner wall of each housing 25 as having formed thereon adjacent its top and bottom edges a pair of take-up casings 43 having slotted cover plates 44. Fitted within each casing 43 is a sliding block 45 which is connected to a screw 46 for adjustment in both directions normal to the inclined surfaces of the belt edge portion. Each of the blocks 45 has rigidly mounted therein a shaft 47 which extends from the casing 43 through the slotted cover plate 44 in parallel relationship with the shafts 28. Rotatably mounted on the inwardly extending end portion of each of the shafts 47 is a take-up wheel 48.

Rigidly mounted on the inwardly extending end portion of each of the shafts 28 is a wheel 49 having a pneumatic tire 51 and tube 52 mounted thereon. The peripheral surface of each tire 51 is spaced from the surface of the adjacent edge portion of the belt 14 and the wheels 49 adjacent each end of the housing 25 are provided with flanges 53 extending radially beyond the peripheries of their tires 51.

Trained over the peripheries of the tires 51 and the corresponding tensioning wheel 48 is a drive belt 54. As illustrated in Figs. 7 and 8, each belt 54 is formed of resilient material which is suitably formed with longitudinally extending strengthening cords 55. At uniformly spaced points along its length, each belt 54 has formed therein cylindrical apertures 56 which extend transversely of the belt and are centered at approximately one-half of the thickness of the belt. A transverse score or slit 57 extends from the outer surface of the belt 54 to each one of the apertures 56 to provide greater flexibility in the belt as it passes over the tires 51 and tensioning wheel 48.

The thickness and position of each belt 54 is such that proper inflation of its associated tubes 52 will urge the belt into tight engagement with the adjacent surface of the belt portion so that the opposed surfaces of the drive belts 54 at one edge of the conveying belt 14 will grip the latter therebetween.

The operation of one of the several identical drive units now will be explained.

When the motor 42 is actuated to rotate the drive shaft 37, all of the gears 31 of the two opposed housings 25 will be set in motion to rotate their associated wheels 49 so as to impart movement to the belts 54 to apply driving forces to the conveyor belt 14 which is gripped between adjacent surfaces of the drive belts at each edge portion of the conveying belt.

It will be apparent that the number of wheels 49 over which each of the belts 54 is trained may be varied to increase or decrease the length of the portion of the belt 14 which will be gripped between adjacent surfaces of the opposed drive belts. Further, the pressure with which the belt 14 is gripped between the opposed drive belts 54 may be varied by increasing or decreasing the pressure of the air in the tubes 52.

It is to be understood that the form of this invention herewith shown and described is to be taken as the preferred example of the same, and that various changes in the shape, size, and arrangement of parts may be resorted to without departing from the spirit of the invention or the scope of the subjoined claims.

Having thus described the invention, I claim:

1. A belt conveyor, comprising an endless flexible conveying belt, means for supporting said belt, and a drive unit formed of a plurality of longitudinally spaced pairs of drive wheels associated with each edge portion of said belt, the drive wheels of each of said pairs having their peripheral surfaces spaced from the opposite surfaces of the associated belt edge portion, a pair of drive belts trained over the drive wheels at each edge portion of the conveying belt, each of said pairs of drive belts drivingly engaging a belt edge portion, and means for driving said drive wheels.

2. A belt conveyor, comprising an endless flexible conveying belt, means for supporting said belt, and a drive unit formed of a plurality of drive wheels spaced from the opposite surfaces at each edge portion of the belt, a pair of drive belts trained over the drive wheels at each edge portion of the conveying belt, each of said pairs of drive belts drivingly engaging opposite surfaces of the belt edge portion, an adjustably mounted wheel engaging each of said drive belts to maintain the proper tension in the latter, and means for driving said drive wheels.

3. A belt conveyor, comprising an endless flexible conveying belt, means for supporting said belt, and a drive unit formed of a plurality of pneumatic tired drive wheels spaced from the opposite surfaces at each edge portion of the belt, a pair of endless drive belts trained over the drive wheels at each edge portion of the conveying belt, each of said pairs of drive belts having transversely scored opposed traveling treads engaging opposite surfaces of the belt edge portion, and means for driving said drive wheels.

4. A belt conveyor, comprising an endless flexible conveying belt, means for supporting said belt, and a drive unit formed of a plurality of pneumatic tired drive wheels, means for rotatably mounting said drive wheels in equally numbered sets with all of the wheels of each set having their peripheral surfaces uniformly spaced from a different one of the surfaces of each edge portion of the belt and certain of said wheels of each set having radial flanges at the edges of their peripheral surfaces, an endless belt trained over each set of drive wheels, each of said drive belts having its outer surface transversely scored to provide a tread for drivingly engaging the surface of the conveying belt edge portion opposite another of said drive belts, and means for driving said drive wheels.

5. A belt conveyor, comprising an endless flexible conveying belt, means for supporting said belt, and a plurality of drive units spaced longitudinally of said conveyor and each formed of a plurality of pneumatic tired drive wheels, means for rotatably mounting said drive wheels in equally numbered sets with all of the wheels of each set having their peripheral surfaces uniformly spaced from a different one of the surfaces of each edge portion of the belt and certain of said wheels of each set having radial flanges at the edges of their peripheral surfaces, an endless drive belt trained over each set of drive wheels, each of said drive belts having its outer surface transversely scored to provide a tread for drivingly engaging the surface of the conveying belt edge portion opposite another of said drive belts, and separate means for driving the drive wheel mounting means.

6. A belt conveyor, comprising an endless flexible conveying belt, means for supporting said belt, and a drive unit formed of a plurality of rotatable shafts arranged in equally numbered sets, a pneumatic tired drive wheel mounted on each of said shafts with the drive wheels of each set in radial alinement and normal to the opposite surfaces of each edge portion of the belt, all of the drive wheels on each set of shafts having their peripheral surfaces uniformly spaced from a different one of said surfaces, an endless drive belt mounted on each set of drive wheels, each of said drive belts having its outer surface transversely scored to provide a tread for drivingly engaging the surface of the conveying belt edge portion opposite another of said drive belts, and means for driving said drive wheels.

7. A belt conveyor, comprising an endless flexible conveying belt, means for supporting said belt, and a drive unit formed of a plurality of pneumatic tired drive wheels, means for rotatably mounting said drive wheels in equally numbered sets with all of the wheels of each set having their peripheral surfaces uniformly spaced from a different one of the surfaces of each edge portion of the belt and certain of said wheels of each set having radial flanges at the edges of their peripheral surfaces, an endless belt trained over each set of drive wheels, each of said drive belts having its outer surface transversely scored to provide a tread for drivingly engaging the surface of the conveying belt edge portion opposite another of said drive belts, means operatively connecting all of the wheels of said drive unit for simultaneous rotation, and means for driving the connected wheels of the drive unit.

8. A belt conveyor, comprising an endless flexible conveying belt, means for supporting said belt, and a plurality of drive units spaced longitudinally of said conveyor and each formed of a plurality of pneumatic tired drive wheels, means for rotatably mounting said drive wheels in equally numbered sets with all of the wheels of each set having their peripheral surfaces uniformly spaced from a different one of the surfaces of each edge portion of the belt and certain of said wheels of each set having radial flanges at the edges of their peripheral surfaces, an endless drive belt trained over each set of drive wheels, each of said drive belts having its outer surface transversely scored to provide a tread for drivingly engaging the surface of the conveying belt edge portion opposite another of said drive belts, means positively connecting the wheel mounting means of each drive unit for simultaneous rotation of the wheels of said unit, and separate means for driving the connected mounting means of each drive unit.

9. A belt conveyor, comprising an endless flexible conveying belt, means for supporting said belt, and a drive unit formed of a plurality of rotatable shafts arranged in equally numbered sets, a pneumatic tired drive wheel mounted on each of said shafts with the drive wheel of each set in radial alinement and normal to the opposite surfaces of each edge portion of the belt, all of the drive wheels on each set of shafts having their peripheral surfaces uniformly spaced from a different one of said surfaces, an endless drive belt mounted on each set of drive wheels, each of said drive belts having its outer surface transversely scored to provide a tread for drivingly engaging the surface of the conveying belt edge portion opposite another of said drive belts, a plurality of gears mounted on said shafts and operatably connected to each other for simultaneous rotation of the shafts of said unit, and a prime mover for driving said gears.

10. A drive for conveyor belts, comprising a plurality of pairs of endless drive belts mounted with the opposite surfaces of each pair of belts in gripping engagement with the opposite surfaces of a section of an inclined edge portion of a troughed conveyor belt, and a prime mover for driving said drive belts.

11. A drive for conveyor belts, comprising a pair of endless drive belts having closely spaced treads supported for gripping engagement with the opposite surfaces of an inclined edge portion of a troughed conveyor belt, and a prime mover for driving said drive belts.

12. A belt conveyor comprising an endless flexible conveyor belt, means for supporting said belt, and a drive unit formed of a pair of relatively narrow endless flexible drive belts, means for supporting the pair of drive belts for movement in a common plane normal to and intersecting an edge portion of the conveyor belt with the two drive belts of the pair arranged one above and one below the conveyor belt and drivingly engaging the opposite surfaces of the latter, and means for driving said pair of belts at the same speed.

13. A belt conveyor, comprising an endless flexible conveyor belt, means for supporting said belt and a drive unit formed of two pairs of relatively narrow endless flexible drive belts, means for supporting the two pairs of drive belts at transversely aligned side portions of the conveyor belt with the two belts of each pair moving in a common plane normal to and intersecting the associated edge portion of and arranged one above and one below the conveyor belt and drivingly engaging the opposite surfaces of the latter, and means for driving both belts of each pair and both pairs of belts at the same speed.

14. A belt conveyor, comprising an endless flexible conveyor belt, means for supporting said belt, and a plurality of drive units spaced longitudinally of said conveyor belt; each drive unit formed of two pairs of relatively narrow endless flexible drive belts, means for supporting the two pairs of drive belts at transversely aligned side portions of the conveyor belt with the two belts of each pair moving in a common plane normal to and intersecting the associated edge portion of and arranged one above and one below the conveyor belt and drivingly engaging the opposite surfaces of the latter, and means for driving both belts of each pair and both pairs of belts at the same speed.

15. A belt conveyor, comprising an endless flexible conveyor belt, means for supporting said belt, and a drive unit formed of two sets of drive wheels, means for supporting the two sets of drive wheels for rotation in a common plane normal to and intersecting an edge portion of and arranged one above and one below the conveyor belt, the drive wheels of the two sets being spaced from the opposite surfaces of the conveyor belt, a relatively narrow endless flexible drive belt trained around each set of drive wheels with the two drive belts engaging the opposite surfaces of the conveyor belt, and means for driving the two sets of drive wheels, and therethrough the two drive belts, at the same speed.

16. A belt conveyor, comprising an endless flexible conveyor belt, means for supporting said belt, and a plurality of drive units spaced longitudinally of said conveyor belt; each drive unit formed of two sets of drive wheels, means for supporting the two sets of drive wheels for rotation in a common plane normal to and intersecting an edge portion of and arranged one above and one below the conveyor belt, the drive wheels of the two sets being spaced from the opposite surfaces of the conveyor belt, a relatively narrow endless flexible drive belt trained around each set of drive wheels with the two drive belts engaging the opposite surfaces of the conveyor belt, and means for driving the two sets of drive wheels, and therethrough the two drive belts, at the same speed.

References Cited in the file of this patent

UNITED STATES PATENTS

| | | |
|---|---|---|
| 1,657,568 | Dancker et al. | Jan. 31, 1928 |
| 1,763,735 | Wydom | June 17, 1930 |
| 2,114,716 | Kunzle | Apr. 19, 1938 |
| 2,386,558 | Kleintop | Oct. 9, 1945 |
| 2,566,021 | Fergnani | Aug. 28, 1951 |
| 2,650,695 | Robins | Sept. 1, 1953 |

FOREIGN PATENTS

| | | |
|---|---|---|
| 439,871 | Germany | Jan. 24, 1927 |